March 12, 1929.  H. NOTZ  1,705,226
FILTER
Filed March 8, 1928  2 Sheets-Sheet 1
Fig.1.
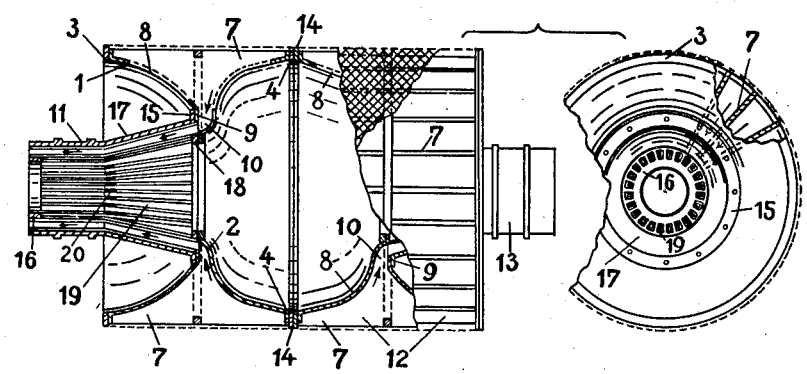
Fig.2.  Fig.4.  Fig.3.
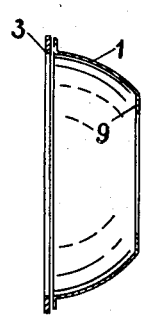 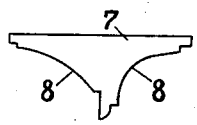 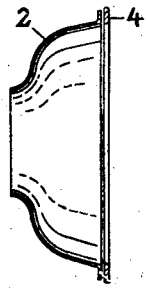
Fig.5.
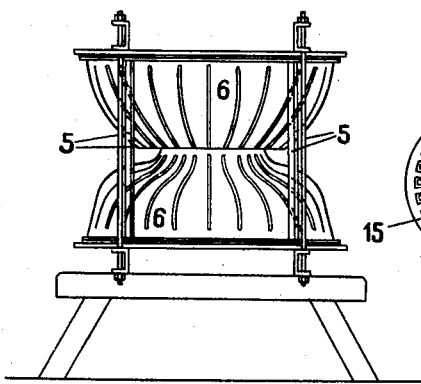
Fig.6.
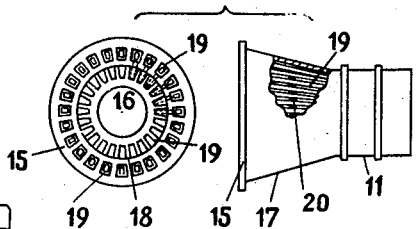
Inventor
H. Notz:
by
W. E. Evans
Attorney.

March 12, 1929.  H. NOTZ  1,705,226
FILTER
Filed March 8, 1928   2 Sheets-Sheet 2
Fig. 7.
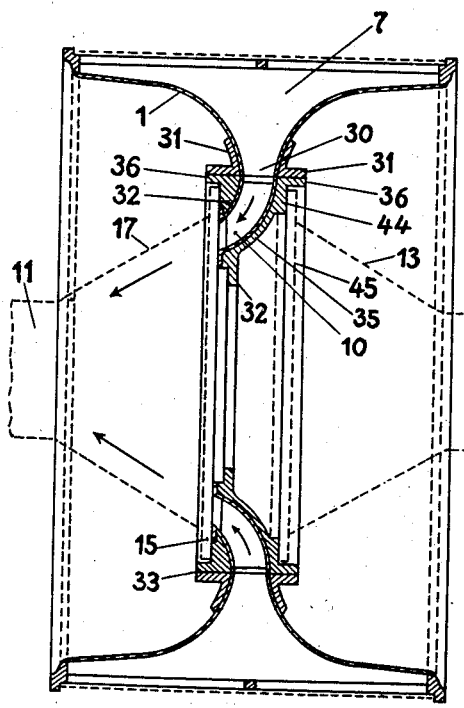
Fig. 8.
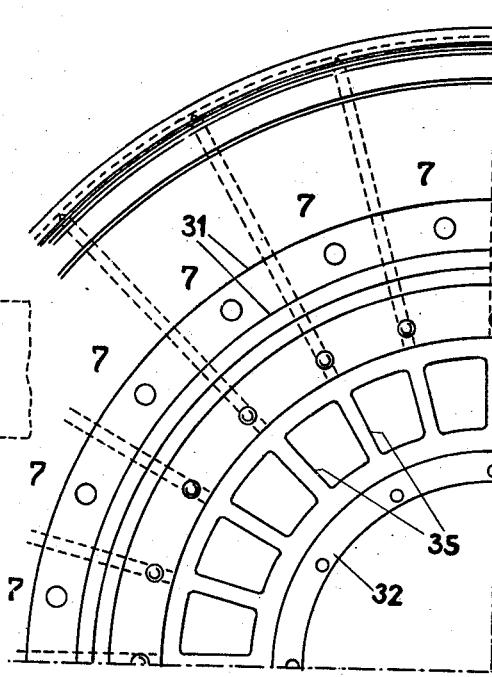
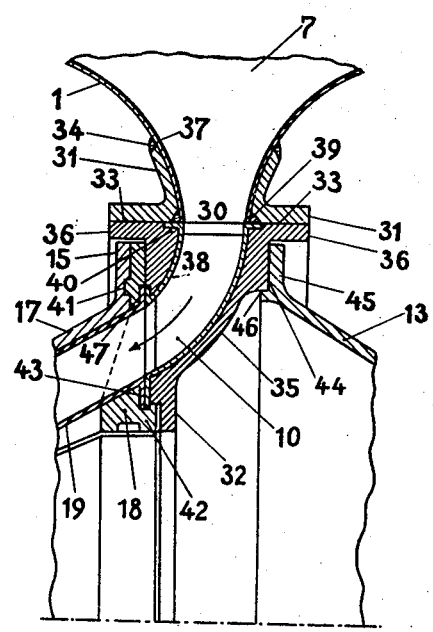
Fig. 9.
Inventor
H. Notz:
by
W. E. Evans
Attorney.

Patented Mar. 12, 1929.

1,705,226

UNITED STATES PATENT OFFICE.

HEINRICH NOTZ, OF MAGDEBURG-BUCKAU, GERMANY, ASSIGNOR TO MASCHINEN-FABRIK BUCKAU R. WOLF AKTIENGESELLSCHAFT, OF MAGDEBURG-BUCKAU, GERMANY.

FILTER.

Application filed March 8, 1928, Serial No. 259,960½, and in Germany July 25, 1925.

The known types of filters, which are formed of a plurality of cells and provided with cast iron drums, have the disadvantage that they very frequently do not meet the special requirements in particular trades and industries, for instance in the chemical industry, in which great resistance to the action of acids and lyes is necessary, and in the food trades, where it is necessary to secure tastiness, desirable colours and wholesomeness.

To avoid the disadvantages indicated, the drum is made according to the invention of rolled and pressed metal, the more important parts being separately pressed (pressed and rolled parts), worked into one another, and welded together, in such manner that the lateral walls or bottom plates of the drum are pressed from the suitable materials in question, after which they are slotted for receiving the walls of the cells and then welded to the walls of the cells, whereby the stresses upon the material are avoided which would otherwise arise.

Drums of cast iron can not be leaded homogeneously. By the method according to the invention drums can be produced of wrought-iron sheets and they can be homogeneously leaded and tinned; consequently the filters can be made use of in factories that deal with substances containing acids and lyes, and similar substances. According to the invention, moreover, in the food trades the bad effect of the formation of rust on iron is avoided if the drums are made in aluminium, rustless steel and other similar materials.

The following important advantages are secured by the use of the filter of the invention:

1. A rotary filter is produced, which in construction and working is exactly similar to the known types of rotary filters made in cast-iron with cast-in suction cells and suction passages, being equally rigid and durable but considerably lighter in weight.

2. The lead of the rotary filter is homogeneous.

3. A rustless rotary filter is produced that resists acid, if the proper materials are employed as have the advantages set forth in paragraph 1 above.

4. The bottom plates of the drums can be provided in series and simply set side by side so as thus to secure separate lengths of drum.

In the drums produced according to the process of the invention the great weight of the wrought-iron leaded cell body is not perfectly transmitted to the trunnions by the bent part which is considerably constricted in the direction of the drum trunnion, for which reason the bending and rotary stresses take effect and may damage and cause leakages to appear in the homogeneous lead layer.

To avoid these disadvantages an intermediate member is inserted according to the invention between the cell bodies and the flanges of the trunnion, in which member are formed the bends or curves of the cells and which is of sufficient strength to transmit the stresses to the trunnions without injurious bending and distortion. As it is in the bent parts that the greatest wear of the lead occurs and such worn parts are difficult of access it is possible, by reason of the ease with which the intermediate member can be withdrawn, to apply the layer of lead upon such worn parts or upon the whole intermediate member fairly easily and to protect for a long time the main cell body against the necessity for renewal.

The drum according to the invention is illustrated in the accompanying drawings, in which Figure 1 shows the complete drum, partly in longitudinal sectional elevation, and in end elevation;

Figures 2, 3 and 4 show the bottom plates and a cell wall of the drum, the former being unslotted;

Figure 5 illustrates a device for marking the slots upon the bottom plates; and

Figure 6 illustrates, in end and side elevation, the trunnions of the drum provided with a set of tubes.

Figures 7 to 9 illustrate the drum with the intermediate member, in which

Figure 7 shows the drum with the intermediate member in cross sectional elevation the trunnion being shown in dotted lines;

Figure 8 is a detail end elevation of a quarter of the intermediate member with part of the drum connected thereto, and Figure 9 is a detail cross-sectional view corresponding to Figure 8.

The drum according to the invention is built up in the following manner:

The main parts of the drum, that is, the two bottom plates 1 and 2, are produced by known pressing operations and are provided with flanges 3 and 4 (Figures 2 and 3). The two bottom plates are temporarily held firmly in the relative position they are required to occupy by corresponding spacing clamps 5 (Figure 5), and the slots 6 are then marked out by means of a marking tool. The two bottom plates are then taken apart and are slotted separately. After being slotted they are joined to the walls 7 of the cells (Figure 4), the walls 7 engaging in the slots 6 of the bottom plates by means of the projecting edges 8. By this means the drum is roughly assembled. Thereupon the walls 7 are fixed in the bottom plates by welding from the inside, at the positions where they lie against the bottom plates, and then the projecting edges 8 are welded in the slots 6 from the outside by arc welding, and so that, in certain circumstances, the stresses that arise are equalized. The known butt welding cannot be employed because there is too little space available on the inside. In the new combination the welding can in part be effected on the outside. In the drum thus constructed suction passages 10 are formed between the bottom plates 1 and 2 and the cell walls 7 and, at the point 9 where are positioned the outlets of the said passages, a trunnion 11, comprising extensions of the said passages, is secured by screws or bolts. The drum 1—10 may be in the form of a narrow suction drum, and, in this case, it is provided with a second trunnion (not illustrated), which is only employed as a bearing, or it is connected to a second similarly constructed drum 12, which has its trunnion 13 upon the opposite side and may be exhausted by vacuum from this side. The flanges 14 provide the connection between the two drums 1—10 and 12.

The cylindrical trunnion 11 is provided with the large flange 15, and also with the small flange 16 which only projects inwardly, and the conical part 17. The flange 15 also projects inwardly at 18 and both flanges 16 and 18 are provided with passage openings of the same number and in the same radial direction as the passages 10. Each passage opening in the flange 16 is in communication by a pipe 19 (Figures 1 and 6) with the passage opening of the flange 18 which is disposed in the same direction, such pipe passing through the flanges 16 and 18 respectively, and all the pipes 19 (in the present case 24 in number) form the set of pipes.

The set of pipes has the advantage over a trunnion having cast-in pipes, that the whole set is interchangeable without any necessity for changing the trunnion, that it can alone (that is, without the trunnion) be made of suitable material (soft lead) or the like, and that the inner walls of the pipes are much smoother and can be better cleaned out than can cast-in pipes, and so on. The set of pipes is only the direct continuation of the suction drum constructed acording to the method of the invention. The pipes 19 are supported from one another at the middle at 20 (Figure 1), for example, by distance pieces, so that they cannot buckle. A stiffening ring is advantageously welded to the drum 1—10 at the position where the flanges 15, 18 is applied upon it, and this ring is similarly provided with passage openings. The stationary regulating head, which is not shown in the drawing fits against the flange 16 under pressure; it may be split up into a number of suction zones, and it forms the connection between the drum and the air pump.

According to the construction hereinbefore described, the drum 1—10 can be homogeneously leaded and tinned internally or it may be built up from sheet metal suitable for use with the materials to be treated. Furthermore, such a drum is considerably lighter than a cast-iron or cast drum; it has exactly the same cross-sectional areas of the passages, so that there is an output which is uniform over the whole of the periphery of the drum.

With regard to the intermediate member, reference is made to Figures 7 to 9 of the accompanying drawings. In these figures the rotary filter drum is provided all round with cells 7, which narrow down very considerably towards the middle 30. At this position the body 1 is provided on both sides with surrounding flanges 31, and the whole is bored out centrally to form a seating 33. To secure a perfect joint at the flanges, these are also welded at 34 (Figure 9). The cast intermediate member 35 in which are provided the passages or bends 10 of the cells, is fitted tightly into the seating 33, and the flanges 36 are secured to the flanges 31 of the body 1 all round by means of screws. The body 1 and the intermediate member 35, may be faced internally with homogeneous lead layers 37, 38, which may extend at 39, 40 over a part of the flanges 31, 36.

The intermediate member 35 is provided with an end face flange 32 perpendicular to the double ring or cylindrical flange 36, to which end face flange is secured the set of pipes 19 by screws passing through the flange 18, the trunnion 17 being secured by screws passing through the flange 15, the flange 18 engaging on the one hand in a recess in the flange 15 by means of an annular rib 41 and on the other hand engaging the inner side of an annular shoulder 43 of the flange 32 by means of an annular projection 42, so that the weight of the heavy body 1 is safely transmitted to the trunnion 17 without stress being imposed upon the lead pipes 19.

The intermediate member 35 is provided upon the other side with an end face flange 44, to which is secured by screws the flange 45 of the trunnion 13 which is without pipes which engages on the inner side of the flange 44 by means of a rib 46. In twin drums the trunnion 13 is dispensed with, and each of the drums is provided with an intermediate member 35 and a trunnion 17 having a set of pipes 19.

Each of the pipes 19 engages by means of its flange 47 in a recess in the flange 18; similarly, the lead lining 38 of the intermediate member 35 is bent over at the edge to form a flange and is inserted in a recess in the flange 32. In Figure 8 these lead insertions are seen in elevation, in heavy lines, the trunnion of the drum and the set of pipes being omitted.

I claim:

1. A drum for rotary cell filters having cell walls disposed between two annular bottom plates, the respective cells being continued through a trunnion of the drum, comprising sheet metal annular bottom plates shaped to curve inwardly towards the axis of the drum, transverse walls to form cells welded at both sides to the said bottom plates, suction passages provided at the inner peripheries of the annular bottom plates into which passages the said cells merge and a plurality of pipe-like members arranged around the trunnion of the drum and communicating respectively with the respective suction passages.

2. A drum for rotary cell plates having cell wall disposed between two annular bottom plates, the respective cells being continued through a trunnion of the drum, comprising annular sheet metal bottom plates and transverse walls to form cells, the said annular bottom plates having flanges at their outer peripheries serving in the first instance to permit the temporary assembly of the bottom plates for the marking out of the positions of the transverse walls and in the second instance for the mounting of the bottom plates in their relative disposition in the drum, the bottom plates being slotted at the said positions to receive the transverse walls, and the transverse walls being provided with projecting edges to fit the said slots, the said transverse walls being welded to the bottom plates on the inside at the points of contact and on the outside at the slots and the projecting edges.

3. A drum for rotary cell filters having cell walls disposed between two annular bottom plates, the respective cells being continued through a trunnion of the drum, comprising sheet metal annular bottom plates shaped to curve inwardly towards the axis of the drum, transverse walls to form with the bottom plates cells extending between the said bottom plates, and an interchangeable intermediate member disposed at the inner peripheries of the bottom plates, the said interchangeable intermediate member being provided with suction passages and flanges for connection to the said bottom plates, the said suction passages being continued in the trunnion of the drum.

4. A drum for rotary cell filters having cell walls disposed between two annular bottom plates, the respective cells being continued through a trunnion of the drum, as set forth in claim 3, wherein the bottom plates are provided at their inner peripheries with flanges to receive the flanges of the interchangeable intermediate member.

5. A drum for rotary cell filters having cell walls disposed between two annular bottom plates, the respective cells being continued through a trunnion of the drum as set forth in claim 1, wherein the trunnion is provided as a hollow body having at each end inwardly directed flanges, the said flanges being formed with openings into which are respectively received the pipe-like members serving as suction passages within the trunnion.

6. A drum for rotary cell filters having cell walls disposed between two annular bottom plates, the respective cells being continued through a trunnion of the drum as set forth in claim 1, having a trunnion in the form of a hollow body provided at one end with a flange by which the trunnion may be secured in position adjacent the inner peripheries of the bottom plates, and at the other end a flange having openings respectively to receive the pipe-like members arranged around the trunnion, and an annular plate provided with openings to receive the inner ends of the pipe-like members, the said annular plate being secured in position adjacent the flange of the trunnion at the inner peripheries of the bottom plates.

7. A drum for rotary cell filters having cell walls disposed between two annular bottom plates, the respective cells being continued through a trunnion of the drum, as set forth in claim 3, having an interchangeable intermediate member formed with suction passages and flanges by which it may be secured in position at the inner peripheries of the bottom plates, a trunnion comprising a hollow body having at the inner end a flange by which it may be secured to the interchangeable intermediate member, a plurality of pipe-like members arranged around the interior of the said trunnion and an annular member for supporting the inner ends of the pipe-like members, the said annular member being disposed between the flange of the trunnion and the interchangeable intermediate member and being provided with an annular rib to engage an annular recess in the said flange, and an annular projection to engage a corresponding annular recess in the interchangeable intermediate member.

8. A drum for rotary cell filters having cell walls disposed between two annular bottom plates, the respective cells being continued through a trunnion of the drum as set forth in claim 3, having an interchangeable intermediate member formed with suction passages extending from the periphery to a lateral face of the said member and seatings in the said periphery and lateral face adjacent the openings of the said suction passages, and metal linings disposed within the suction passages and provided with flanges to engage in the seatings before referred to.

HEINRICH NOTZ.